United States Patent
Mukunashi

(10) Patent No.: US 10,244,174 B2
(45) Date of Patent: Mar. 26, 2019

(54) IMAGE SHAKE CORRECTION APPARATUS, LENS APPARATUS, IMAGING APPARATUS, AND CONTROL METHOD

(71) Applicant: CANON KABUSHIKI KAISHA, Tokyo (JP)

(72) Inventor: Masayuki Mukunashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/878,810

(22) Filed: Jan. 24, 2018

(65) Prior Publication Data

US 2018/0220074 A1   Aug. 2, 2018

(30) Foreign Application Priority Data

Jan. 31, 2017   (JP) ................. 2017-015025

(51) Int. Cl.
*H04N 5/232* (2006.01)

(52) U.S. Cl.
CPC ..... *H04N 5/23287* (2013.01); *H04N 5/23258* (2013.01); *H04N 5/23296* (2013.01)

(58) Field of Classification Search
CPC .............. H04N 5/23287; H04N 5/232; H04N 5/23258; H04N 5/23296; H04N 5/23264; H04N 5/23251; H04N 5/23254; H04N 5/23293; H04N 5/23222; H04N 5/2353; G02B 27/644; G02B 27/646; G06T 5/002
USPC ...................................................... 348/208.4
See application file for complete search history.

(56) References Cited

U.S. PATENT DOCUMENTS

| | | | |
|---|---|---|---|
| 8,896,716 B2 * | 11/2014 | Miyasako | G02B 27/646 348/208.1 |
| 9,613,430 B2 * | 4/2017 | Tsuchiya | H04N 5/23258 |
| 9,635,265 B2 * | 4/2017 | Mukunashi | H04N 5/23287 |
| 9,900,513 B2 * | 2/2018 | Imada | H04N 5/23287 |
| 9,912,867 B2 * | 3/2018 | Takayanagi | H04N 5/23293 |
| 9,986,164 B2 * | 5/2018 | Wada | G03B 5/00 |
| 10,091,424 B2 * | 10/2018 | Takayanagi | G06T 5/003 |
| 2011/0013031 A1 * | 1/2011 | Miyasako | G02B 27/646 348/208.99 |
| 2015/0237260 A1 * | 8/2015 | Mukunashi | H04N 5/23287 348/208.11 |
| 2015/0358545 A1 * | 12/2015 | Wakamatsu | H04N 5/23219 348/208.1 |
| 2016/0173781 A1 * | 6/2016 | Tsuchiya | H04N 5/23258 348/208.7 |

(Continued)

FOREIGN PATENT DOCUMENTS

| | | |
|---|---|---|
| JP | H04-163535 A | 6/1992 |
| JP | 2005-043780 A | 2/2005 |

*Primary Examiner* — Pritham D Prabhakher
(74) *Attorney, Agent, or Firm* — Carter, Deluca, Farrell & Schmidt, LLP

(57) ABSTRACT

According to an aspect of the invention, an offset calculator calculates a first offset value from an angular velocity detection signal which is detected by an angular velocity sensor and determines a panning offset value as a second offset value. A camera shake correction controller controls driving of a shift lens group and performs camera shake correction on the basis of a signal obtained by subtracting the first offset value. A panning controller acquires angular velocity data of an object with respect to an imaging apparatus which is calculated on the basis of the signal obtained by subtracting the panning offset value.

16 Claims, 9 Drawing Sheets

(56) References Cited

U.S. PATENT DOCUMENTS

| | | | |
|---|---|---|---|
| 2017/0006228 A1* | 1/2017 | Takayanagi | H04N 5/23293 |
| 2017/0013198 A1* | 1/2017 | Wada | G06T 5/20 |
| 2017/0134659 A1* | 5/2017 | Miyahara | H04N 5/23251 |
| 2017/0155842 A1* | 6/2017 | Takayanagi | G06T 5/003 |
| 2017/0163894 A1* | 6/2017 | Wakamatsu | H04N 5/23267 |
| 2017/0214838 A1* | 7/2017 | Miyazawa | H04N 5/2353 |

* cited by examiner

IMAGE SHAKE CORRECTION APPARATUS, LENS APPARATUS, IMAGING APPARATUS, AND CONTROL METHOD

BACKGROUND OF THE INVENTION

Field of the Invention

The present invention relates to a technique of correcting an image shake.

Description of the Related Art

An image shake correction apparatus that is mounted in an imaging apparatus or an interchangeable lens detects shake and corrects the image shake by controlling movement of an optical member or an imaging element. A function of correcting the image shake due to camera shake or the like by driving control of a movable correction lens or the imaging element is referred to as optical image shake correction. For example, driving of a correction lens or the imaging element is controlled in a direction in which the image shake is cancelled on the basis of an angular velocity detected by an angular velocity sensor such as a gyro sensor. When the angular velocity sensor has an offset error, it is difficult to satisfactorily secure accuracy of shake correction. When an angular velocity detection signal includes offset noise specific to the sensor or low-frequency noise due to a change in temperature, integration for calculating a shake correction value cannot be performed completely. Accordingly, a process of performing pseudo-integration using a low-pass filter is performed and thus performance in a low frequency band equal to or lower than a predetermined frequency has to be sacrificed. Japanese Patent Laid-Open No. 2005-43780 discloses a method of updating and specifying an offset of an angular velocity sensor in real time.

On the other hand, in panning which is an imaging technique for expressing a sense of speed of an object, a photographer performs a panning operation on a camera according to a motion of an object for the purpose of stopping an image of an object (a moving object) and causing a background image to flow. In this case, when a speed of the panning operation which is performed by the photographer is too high or too low, a difference between a moving speed of an object and the speed of the panning operation occurs and the image shake may occur in an object image as well as a background image.

An apparatus disclosed in Japanese Patent Laid-Open No. 4-163535 corrects the image shake of an object by moving a part of an optical system or an imaging unit during exposure on the basis of a "relative angular velocity of an object to an imaging apparatus which is calculated before exposure" and an "angular velocity of the imaging apparatus during exposure which is acquired from an angular velocity sensor." The relative angular velocity of an object to the imaging apparatus is calculated on the basis of a moving distance of the object on an image surface detected from images which are continuous in time and an output from the angular velocity sensor. In a structure of a function of supporting a user's panning (hereinafter referred to as "panning assist"), it is important to detect a main object. When an offset component is included in angular velocity detection information, a decrease in accuracy is caused and thus an angular velocity from which the offset component has been removed is acquired.

In an imaging apparatus according to the related art, a process of updating an offset of an angular velocity sensor in real time is performed. In this case, when two angular velocities of the "relative angular velocity of an object to the imaging apparatus which is calculated before exposure" and the "angular velocity of the imaging apparatus during exposure which is acquired from an angular velocity sensor" are based on different offsets in panning, an accurate correction process cannot be performed. For example, when an offset before exposure is 5 degrees per second (dps) and an offset during exposure is 1 dps, a difference of 4 dps may be generated and excessive correction may be performed even if an actual angular velocity of an object is constant.

SUMMARY OF THE INVENTION

The invention proposes a technique of performing accurate image shake correction when an output of a shake-detection sensor including an offset is acquired.

According to an aspect of the invention, there is provided an image shake correction apparatus that corrects a shake of an object image using an image shake correction unit, the object image being imaged by an imaging unit through an imaging optical system, the image shake correction apparatus comprising: a memory; and a processor operating in accordance with a program stored in the memory. The processor comprises: an offset calculator configured to acquire a detection signal of shake from a first detector and to calculate first and second offset values; a first controller configured to control the image shake correction unit using a first signal obtained by subtracting the first offset value from the detection signal; an angular velocity calculator configured to calculate angular velocity data of the object image with respect to the image shake correction apparatus from a second signal obtained by subtracting the second offset value from the detection signal, a moving distance of the object image detected by a second detector, and a focal distance of the imaging optical system; and a second controller configured to calculate a difference between the angular velocity data of the object image and data indicated by the second signal and to control the image shake correction unit.

Further features of the invention will become apparent from the following description of exemplary embodiments with reference to the attached drawings.

DESCRIPTION OF THE EMBODIMENTS

Hereinafter, embodiments of the invention will be described in detail.

First embodiment

Figure 1:
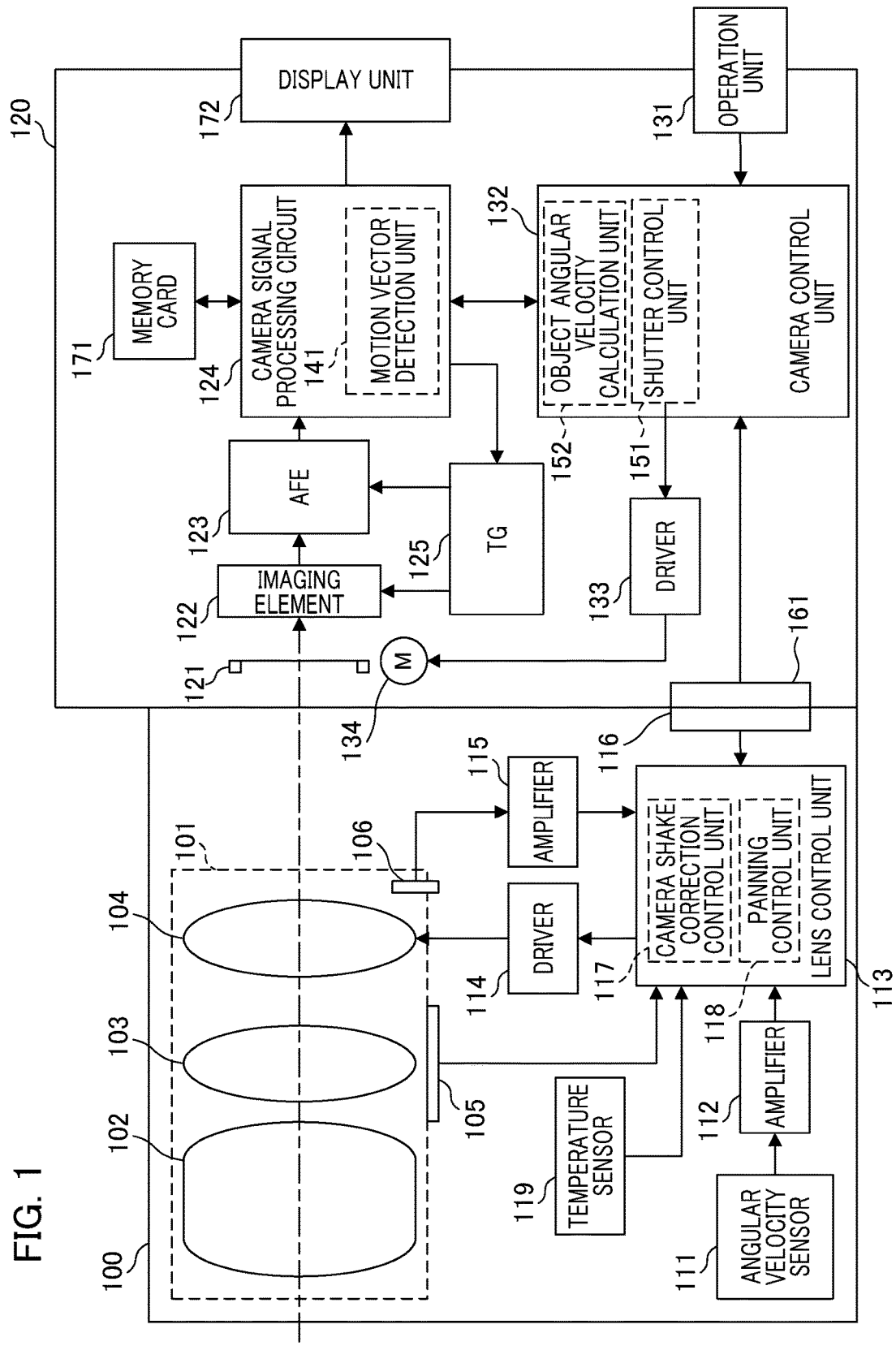
FIG. 1 is a diagram illustrating an overall configuration in a first embodiment of the invention.

FIG. 1 is a diagram illustrating a configuration of an imaging apparatus according to a first embodiment. An example in which an imaging system in which an interchangeable lens 100 is attachable to a camera body portion 120 will be described below. In the following description, a digital camera having a panning assist function of supporting panning will be exemplified. A control mode when panning assist setting has been performed is referred to as a "panning assist mode."

The interchangeable lens 100 includes an imaging lens unit 101. The imaging lens unit 101 includes a main imaging optical system 102, a zoom lens group 103 that can change a focal distance, and a shift lens group 104 for image shake correction. The shift lens group (hereinafter also simply referred to as a shift lens) 104 has a function of a correction lens that corrects the image shake by changing an image forming position of light from an object. By moving the shift lens in a direction perpendicular to an optical axis of the imaging lens unit 101, it is possible to optically correct the image shake with respect to the optical axis due to shake of the imaging apparatus.

The interchangeable lens 100 includes a zoom encoder 105, a position sensor 106, and an angular velocity sensor 111. The zoom encoder 105 detects a position of the zoom lens group 103. The position sensor 106 detects a position of the shift lens group 104. The angular velocity sensor 111 is an example of a shake detection unit that detects shake of the imaging apparatus, and outputs a shake detection signal. An amplifier 112 amplifies an output signal of the angular velocity sensor 111.

A lens control unit 113 includes a microcomputer for control of a lens system. The lens control unit 113 performs driving control of the shift lens group 104 via a driver 114. An amplifier 115 amplifies an output of the position sensor 106 of the shift lens group 104 and outputs a position detection signal to the lens control unit 113.

The interchangeable lens 100 includes a mount contact portion 116 and is connected to a mount contact portion 161 of the camera body portion 120. A temperature sensor 119 detects a temperature and outputs a temperature detection signal to the lens control unit 113. The lens control unit 113 includes first and second control units. The first control unit is a camera shake correction control unit 117 that performs camera shake correction control. The second control unit is a panning control unit 118 that performs panning assist control. The lens control unit 113 also performs control of focal point adjustment based on movement of a focus lens, control of an iris diaphragm, and the like, which are not described for the purpose of simplification of illustration. In the camera shake correction by the camera shake correction control unit 117, detection and correction of shake are performed on two axes perpendicular to each other, such as a horizontal direction and a vertical direction, the same configuration is applied for the two axes, and thus only one axis side will be described below.

The camera body portion 120 includes a shutter 121 that controls an exposure time. An imaging element 122 is a complementary metal-oxide semiconductor (CMOS) type image sensor or the like, receives light from an object which forms an image through an imaging optical system, and converts the received light into an electrical signal by photoelectric conversion. An analog signal processing circuit (AFE) 123 processes a signal output from the imaging element 122 and supplies the processed signal to a camera signal processing circuit 124.

The camera signal processing circuit 124 includes a motion vector detection unit 141. The motion vector detection unit 141 detects a motion of an object on the basis of the output of the imaging element 122. The camera signal processing circuit 124 processes a signal output from the imaging element 122, outputs a recording signal to a memory card 171, and outputs a display signal to a display unit 172. A timing generator (TG) 125 sets an operation timing of the imaging element 122 or the analog signal processing circuit 123. An operation unit 131 includes a power supply switch, a release switch, and a changeover switch. A user can operate the changeover switch to set a panning assist mode.

A camera control unit 132 includes a microcomputer for control of a camera system and controls constituent units of the imaging system. The camera control unit 132 includes a shutter control unit 151 and an object angular velocity calculation unit 152 that calculates an angular velocity of a main object. The shutter control unit 151 controls a motor 134 for driving the shutter via a driver 133 and controls an operation of the shutter 121. The memory card 171 is a recording medium on which signals of captured images are recorded. The display unit 172 includes a display device such as a liquid crystal panel (LCD). The display unit 172 displays an image which a user intends to capture with a camera on a monitor and displays the captured image on a screen of the monitor.

The camera body portion 120 includes amount contact portion 161 which is mounted with the interchangeable lens 100. The lens control unit 113 and the camera control unit 132 perform serial communication with each other via the mount contact portions 116 and 161 at a predetermined time.

In the imaging system illustrated in FIG. 1, when a user operates the power supply switch of the operation unit 131 and the power supply of the camera is turned on, a state change thereof is detected by the camera control unit 132. The camera control unit 132 performs supply of electric power to circuits of the camera body portion 120 and initial setting thereof. Electric power is supplied the interchangeable lens 100 and the lens control unit 113 performs initial setting in the interchangeable lens 100. After the camera control unit 132 and the lens control unit 113 enter a communicable state, communication therebetween is started at a predetermined time. In communication from the camera control unit 132 to the lens control unit 113, a camera state, imaging setting information, and the like are transmitted. In communication from the lens control unit 113 to the camera control unit 132, focal distance information of the interchangeable lens 100, angular velocity information, and the like are transmitted.

A user can perform switching between a normal mode and a panning assist mode by operating the changeover switch of the operation unit 131. The normal mode is a mode in which the panning assist mode is not set. In the normal mode, the angular velocity sensor 111 in the interchangeable lens 100 detects shake of the camera due to a hand shake or the like. The camera shake correction control unit 117 controls driving of the shift lens group 104 using the detection result from the angular velocity sensor 111. Accordingly, since a camera shake correcting operation is performed, the image shake of a captured image is reduced.

Figure 2:
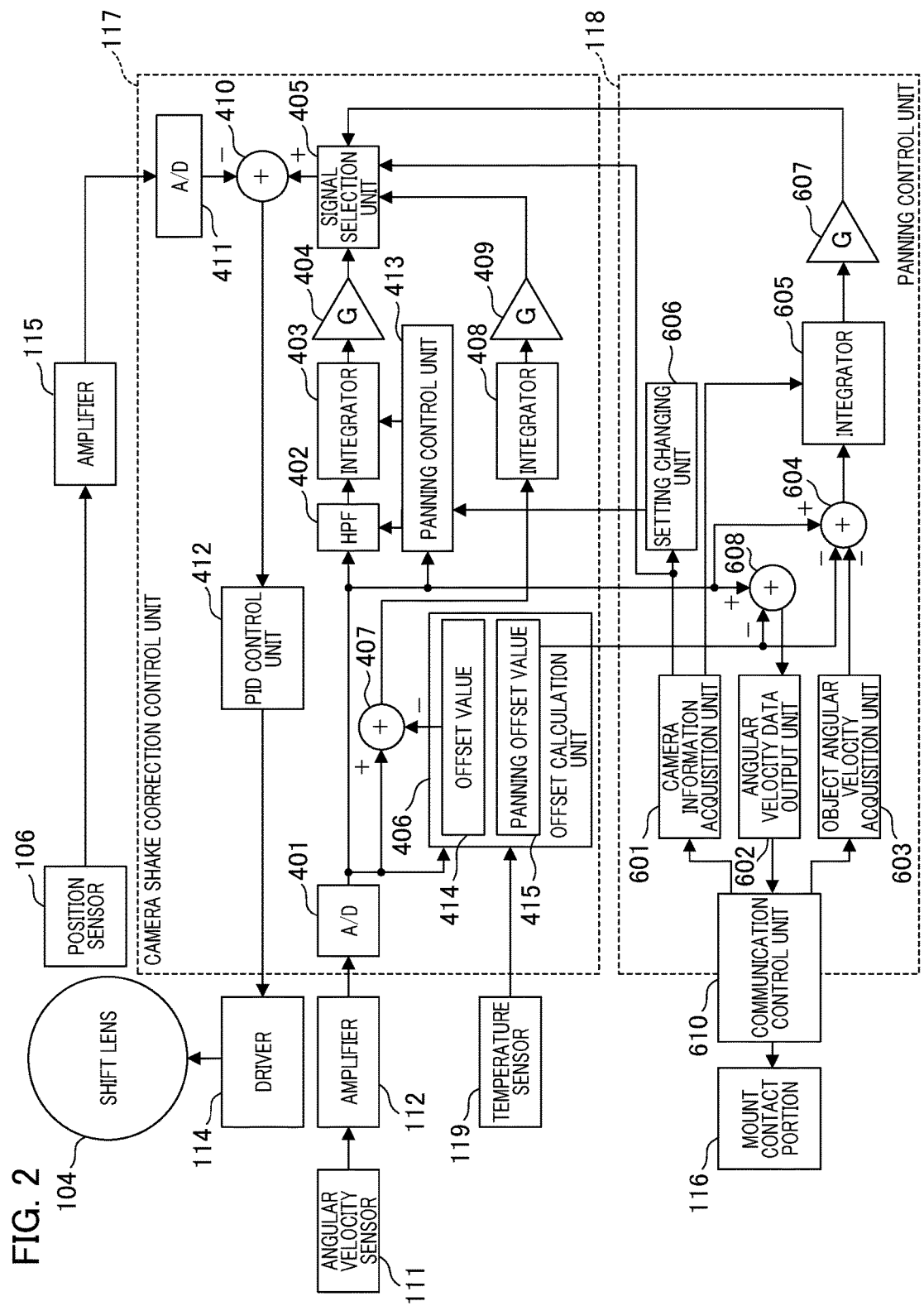
FIG. 2 is a diagram illustrating a configuration of panning assist control according to the first embodiment.

A camera shake correcting function will be described below with reference to FIG. 2. FIG. 2 is a diagram illustrating a configuration of the camera shake correcting operation and the panning assist operation. The same elements as illustrated in FIG. 1 will be referenced by the same reference signs and description thereof will not be repeated.

camera shake correction control unit 117 includes an A/D converter 401 and converts a shake detection signal (an analog signal) which has been detected by the angular velocity sensor 111 and amplified by the amplifier 112 into a digital signal. Data sampling of the output of the angular velocity sensor 111 is performed at about 1 kHz to 10 kHz. A high-pass filter (HPF) 402 removes an offset component or a temperature drift component included in the output of the angular velocity sensor 111 from the output of the A/D converter 401. A panning handling process is performed by changing a cutoff frequency of the high-pass filter 402. An output signal of the high-pass filter 402 is sent to an integrator 403.

The integrator 403 pseudo-integrates angular velocity data and converts the angular velocity data into angle data. The pseudo-integration is performed mainly using a low-pass filter. A sensitivity multiplication unit 404 for optical camera shake correction acquires an output of the integrator 403 and converts the angle data into a shift value corresponding to a moving distance of the shift lens group 104. The sensitivity is a value which varies depending on the focal distance and the sensitivity varies whenever the focal distance varies. A correction value based on sensitivity adjustment of the angular velocity sensor 111 is reflected in the sensitivity multiplication, and sensitivity unevenness is reduced. Hereinafter, the output of the sensitivity multiplication unit 404 is referred to as a first shake correction value.

As for the angular velocity sensor 111, an offset calculation unit 406 acquires the output of the A/D converter 401 and the detection signal of the temperature sensor 119, and calculates an offset component from the angular velocity detection signal. The offset calculation unit 406 stores a first offset value 414 and a second offset value (hereinafter referred to as a panning offset value) 415. An adder 407 acquires the output of the A/D converter 401 and the first offset value 414. An adder 407 removes an offset by subtracting the first offset value 414 from the angular velocity data. In this specification, it is assumed that subtraction is included as addition with a negative value and is performed by an adder.

An integrator 408 performs pseudo-integration mainly using a low-pass filter on an output of the adder 407 and converts the angular velocity data into angle data. A sensitivity multiplication unit 409 for optical camera shake correction multiplies the output of the integrator 408 by sensitivity. This is the same as the sensitivity multiplication unit 404 and description thereof will not be repeated. Hereinafter, the output of the sensitivity multiplication unit 409 is referred to as a second shake correction value. A process of the high-pass filter 402 is performed in case of the first shake correction value, but the process of the high-pass filter is not performed in case of the second shake correction value. Accordingly, it is possible to perform compensation in a band lower than that of the first shake correction value using the second shake correction value.

A signal selection unit 405 for an image shake correction signal acquires outputs of the sensitivity multiplication units 404 and 409 and a sensitivity multiplication unit 607 which will be described later and selects a signal as follows.

(1) Case in which the panning assist mode is set
(1-A) During exposure for a still image: The signal selection unit 405 selects the output of the sensitivity multiplication unit 607.
(1-B) Other than exposure for a still image: The signal selection unit 405 outputs zero as a default value. In this case, driving of the shift lens group 104 is not performed. This is for simplifying calculation of a moving distance on an image plane.
(2) Case in which the panning assist mode is not set
(2-A) During exposure for a still image: The signal selection unit 405 selects the output of the sensitivity multiplication unit 409. This is for enhancing accuracy of the image shake correction.
(2-B) Other than exposure for a still image: The signal selection unit 405 selects the output of the sensitivity multiplication unit 404.

The A/D converter 411 converts an analog signal, which is obtained by amplifying the output of the position sensor 106 using the amplifier 115, into digital data. An adder 410 subtracts the output of the A/D converter 411 from the output of the signal selection unit 405. Since the output of the A/D converter 411 corresponds to current position data of the shift lens group 104, it is possible to calculate actual driving data of the shift lens group 104 through subtraction in the adder 410.

A PID control unit 412 acquires the output of the adder 410 and performs P (proportional), I (integral), and D (differential) operations. The PID control unit 412 is a controller that performs position control of the shift lens group 104, calculates a correction value, and outputs the calculated correction value to the driver 114 for driving the shift lens.

A panning control unit 413 acquires the output of the A/D converter 401 and determines whether a panning operation of the camera has been performed from the state of the angular velocity data. When it is determined that the panning operation has been performed, the panning control unit 413 performs change control of a cutoff frequency of the high-pass filter 402 and adjustment of the output of the integrator 403. Details of the panning control will be described later with reference to FIG. 4.

Figure 3:
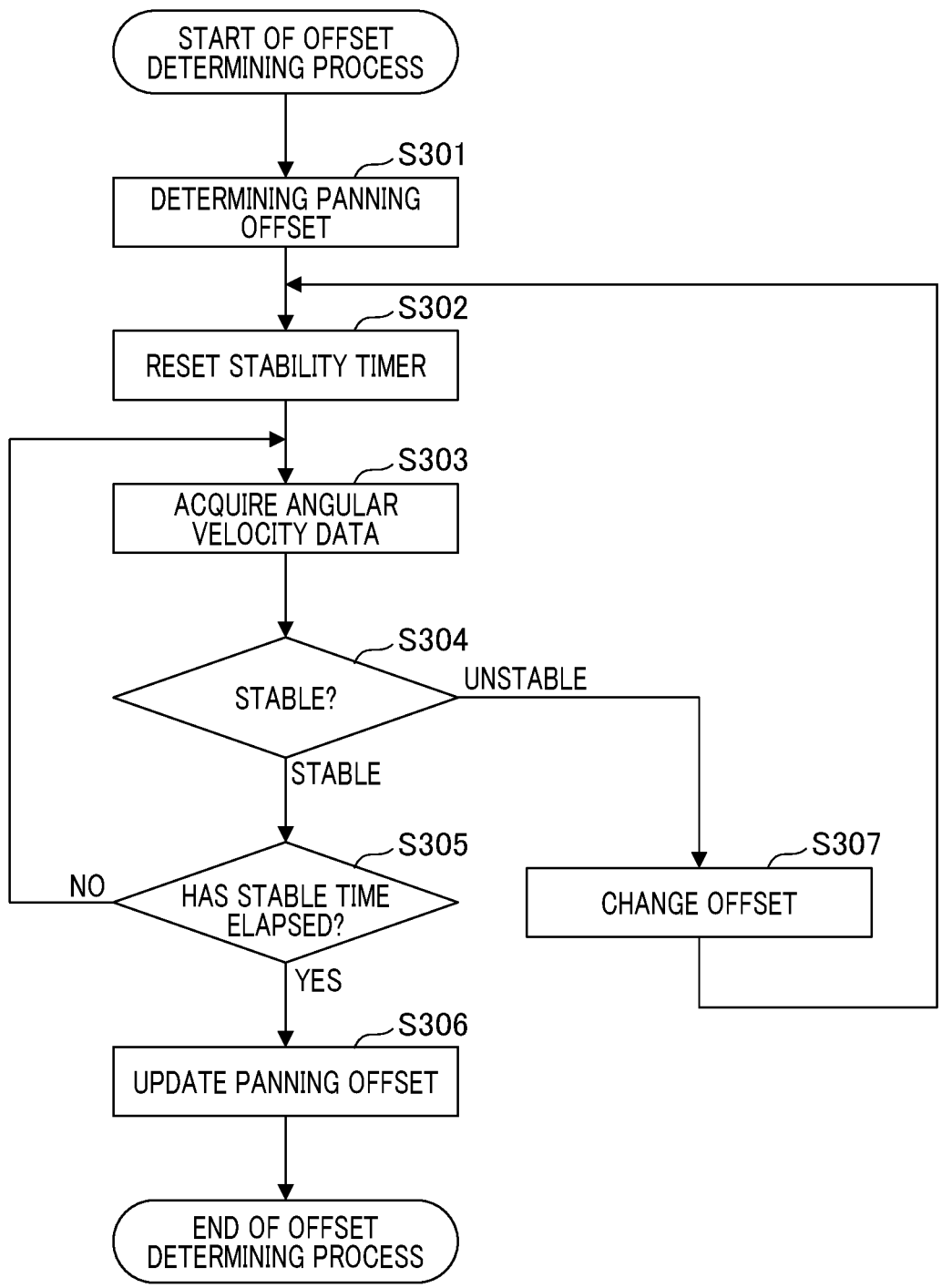
FIG. 3 is a flowchart illustrating an offset determining process according to the first embodiment.

A process which is performed by the offset calculation unit 406 illustrated in FIG. 2 will be described below with reference to FIG. 3. FIG. 3 is a flowchart illustrating an offset determining process of the angular velocity sensor 111. When the offset determining process is started, preliminary values of the first offset value 414 and the panning offset value 415 are determined on the basis of the angular velocity data acquired from the angular velocity sensor 111 and are stored in a memory in S301. The offset calculation unit 406 acquires a temperature detection signal from the temperature sensor 119 and stores the acquired temperature detection signal in the memory, and the panning offset value 415 is changed depending on the temperature at the time at which the offset value is actually used. In S302, the offset calculation unit 406 sets the value of a timer for determining stability of the offset value to zero. The timer value is assumed to increase with elapse of time.

In S303, the offset calculation unit 406 acquires angular velocity data from the angular velocity sensor 111, and the process transitions to S304. In S304, the offset calculation unit 406 performs the determination of stability by calculating a difference between the angular velocity data acquired in S303 and the first offset value 414 and comparing the calculated difference with a threshold value. The threshold value (unit: dps) is set in advance. The process transitions to S305 when the calculated difference is equal to or less than the threshold value, and the process transitions to S307 when the calculated difference is greater than the threshold value.

In S305, the timer value is compared with a predetermined time (a stabilization time). The predetermined time is a time threshold value for determining whether duration is sufficient when it is determined that the difference calculated in S304 is equal to or less than the threshold value, and is set on the basis of a predetermined elapsed time. When the timer value is greater than the predetermined time, that is, when a sufficient time elapses, the process transitions to S306. When the timer value is equal to or less than the predetermined time, the process returns to S303.

In S306, the offset calculation unit 406 performs a process of updating the panning offset value 415 using the current offset value 414. The panning offset value 415 is changed to the current offset value 414 and the process ends. Here, the temperature detection signal stored in S301 is updated.

On the other hand, in S307, the offset calculation unit 406 updates the offset value 414 to the angular velocity data acquired in S303 and returns the process to S302.

The offset value 414 can be determined by performing the above-mentioned offset determining process, but there is a likelihood that the offset value 414 will change until the process ends. That is, the offset value 414 changes whenever time elapses. In this embodiment, a simple method for determining the offset value 414 is described above. The invention is not limited thereto, but a method of gradually increasing the accuracy by feedback control may be used as described in Japanese Patent Laid-Open No. 2005-43780.

Figure 4:
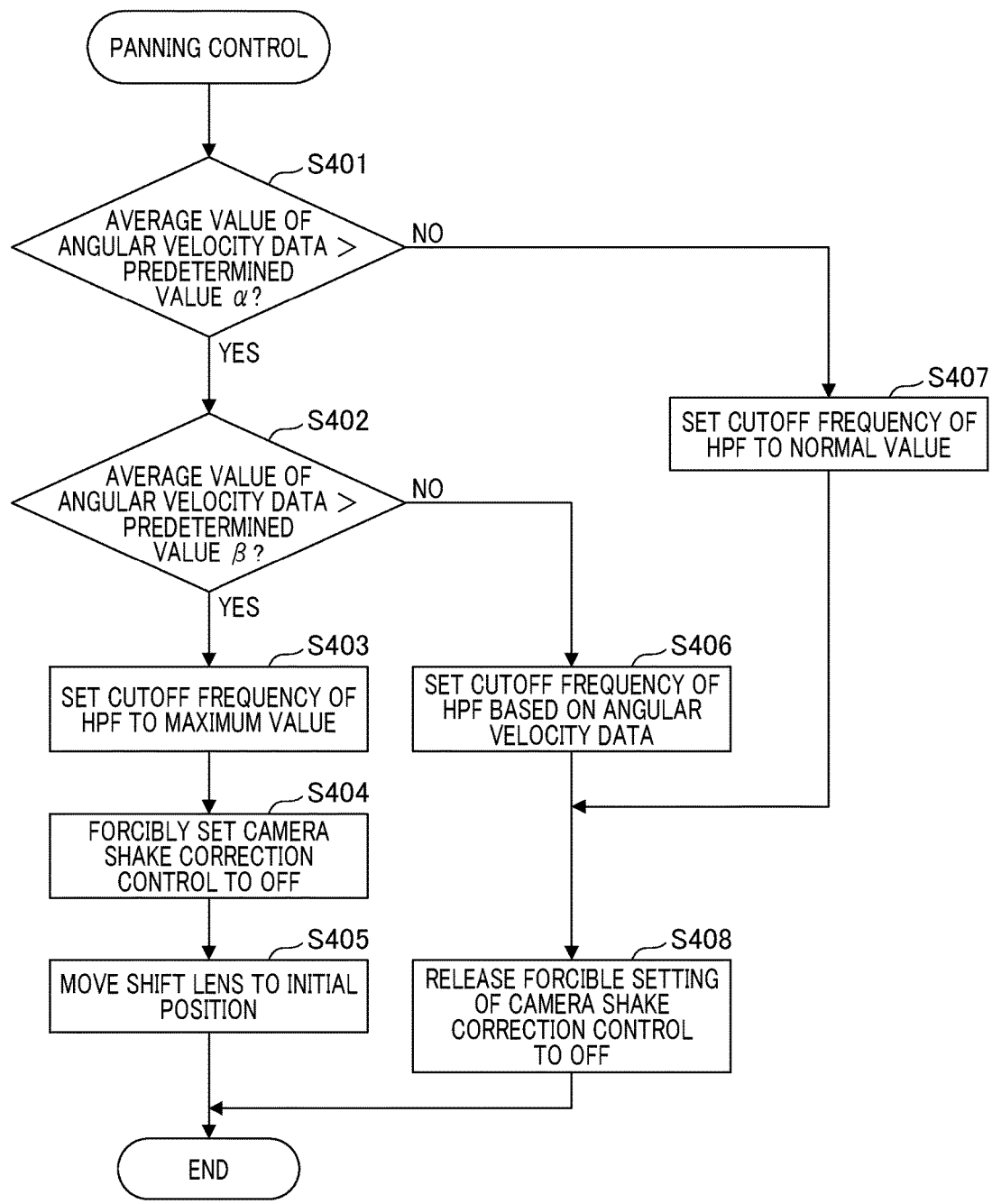
FIG. 4 is a flowchart illustrating panning control.

An example of panning control will be described below with reference to FIG. 4. FIG. 4 is a flowchart illustrating a process which is performed by the camera shake correction control unit 117. In the following description, panning control when a user performs a panning operation as an operation of changing an imaging direction will be described, but the same is true of tilting control.

In S401, the panning control unit 413 calculates an average value of the angular velocity data (an average value corresponding to a predetermined number of sampling times) input from the A/D converter 401, and compares the calculated average value with a predetermined value (which is denoted by α). The predetermined value a is a preset threshold value. When it is determined that the average value of the angular velocity data is greater than the predetermined value a, the process transitions to S402. When it is determined that the average value of the angular velocity data is equal to or less than the predetermined value a, it is determined that the panning operation is not performed and the process transitions to S407.

In S402, the panning control unit 413 determines whether the average value of the angular velocity data received from the A/D converter 401 is greater than a predetermined value (which is denoted by β). The predetermined value β is a preset threshold value and satisfies "α<β." When it is determined that the average value of the angular velocity data is equal to or less than the predetermined value β, it is determined that a slow panning operation is performed and the process transitions to S406. When it is determined that the average value of the angular velocity data is greater than the predetermined value β, it is determined that a fast panning operation is performed and the process transitions to S403.

The panning control unit 413 sets the cutoff frequency of the high-pass filter 402 to a maximum value in S403, and forcibly sets the camera shake correction control to OFF in S404. Since control is performed such that the shift lens stops slowly by increasing the cutoff frequency of the high-pass filter 402, it is possible to reduce a user's feeling of discomfort when the camera shake correction control is turned off. In the fast panning operation, a moving distance by panning is very larger than the magnitude of the camera shake. Accordingly, by turning off the camera shake correction control, there little feeling of discomfort even when an influence of camera shake remains. When the imaging apparatus corrects the shake in the panning operation which is a larger shake without performing such setting, there is a likelihood that a motion of an image stops at the start time of the panning operation, but the motion of the image will increase suddenly. This is because an image suddenly starts large movement at a time of the shift lens group 104 reaches a correction end (a limit position of a control range) and thus is recognized as a very unnatural motion by a user. The setting of S403 is performed to avoid this phenomenon.

Thereafter, in S405, control of moving the shift lens group 104 to an initial position is performed. That is, by performing a process of slowly changing the output of the integrator 403 illustrated in FIG. 2 from current data to data of the initial position, the shift lens group 104 moves to the initial position. This is because it is preferable that the position of the shift lens is the initial position of a driving range when a next camera shake correcting operation is restarted.

When the process transitions from S402 to S406 (when the average value of the angular velocity data is equal to or less than the predetermined value β), the panning control unit 413 determines that a slow panning operation is being performed. In S406, the panning control unit 413 sets the cutoff frequency of the high-pass filter 402 depending on the magnitude of the angular velocity data. This is because when a slow panning operation is being performed, an influence of the camera shake cannot be all ignored. The process of S406 is a process which is required for correcting the camera shake while maintaining trackability of an image in the panning operation to such an extent that is not unnatural.

When the process transitions from S401 to S407 (when the average value of the angular velocity data is equal to or less than the predetermined value β), the panning control unit 413 determines that the panning operation is not being performed. In S407, the panning control unit 413 sets the cutoff frequency of the high-pass filter 402 to a predetermined normal value. After S406 and S407 are performed, in S408, the panning control unit 413 releases forcible setting of the camera shake correction control to OFF. After S405 or S408 is performed, the process for the panning control ends.

Figure 5:
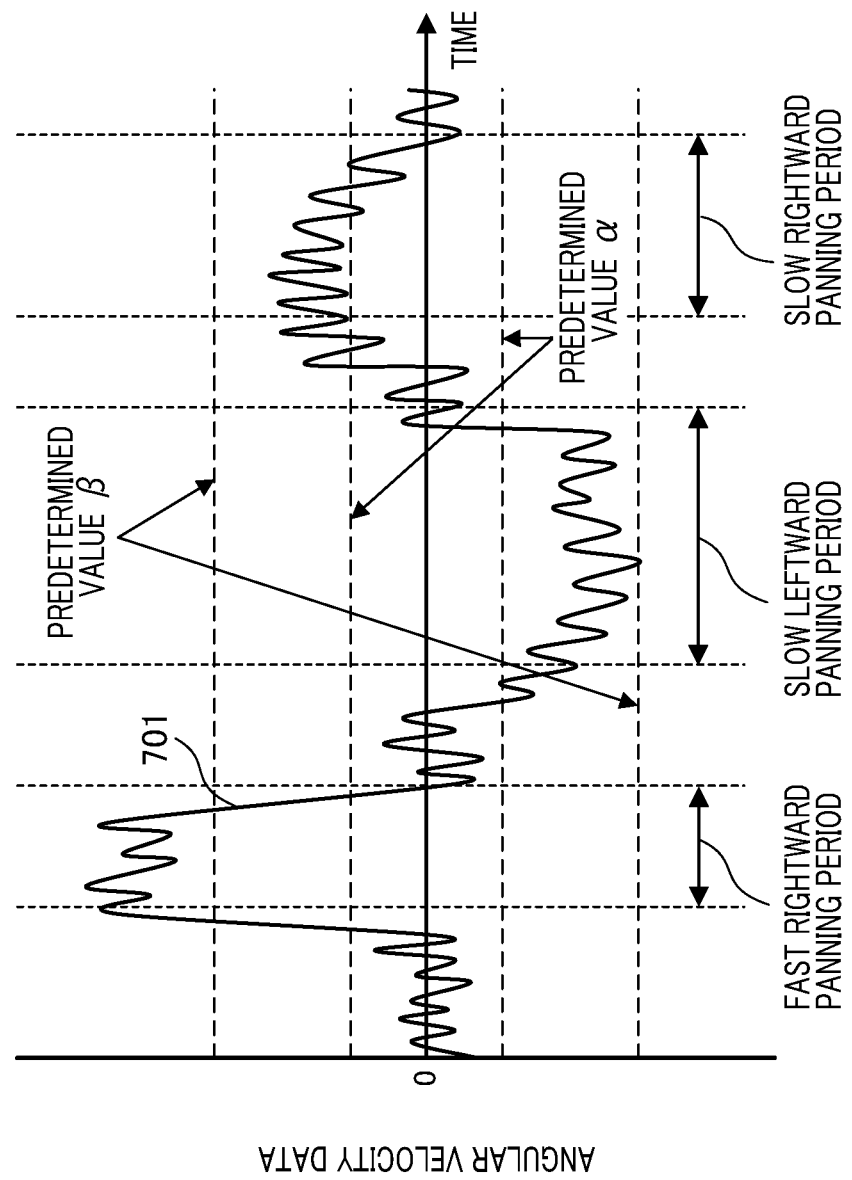
FIG. 5 is a diagram illustrating panning determination.

The panning operation will be specifically described below with reference to FIG. 5. FIG. 5 is a diagram illustrating a relationship between the angular velocity data in the horizontal direction in the panning operation and the predetermined values α and β. The horizontal axis represents time, and the vertical axis represents angular velocity data. A graph 701 denotes a change of the angular velocity data (sampling data) with the elapse of time. In this example, it is assumed that the output in rightward panning has a + direction and the output in leftward panning has a − direction. The initial value of the angular velocity data is set to zero. In the example illustrated FIG. 5, it is assumed that fast rightward panning and slow rightward or leftward panning are detected. In the period of the fast rightward panel, the magnitude of the angular velocity data is greater than the predetermined value β. In the period of the slow rightward or leftward panning, the magnitude of the angular velocity data is greater than the predetermined value α and less than the predetermined value β.

During the panning operation, the angular velocity data departs greatly from the initial value. Accordingly, when a driving target value of the shift lens is calculated by integrating the angular velocity data, the output of the integrator has a very large value due to a DC offset component (a DC component) and there is a likelihood of non-controllability. Therefore, when the panning operation is detected, it is necessary to cut the DC offset component by increasing the cutoff frequency of the high-pass filter 402. In case of fast panning, the output of the integrator increases and thus setting of increasing the cutoff frequency is performed. Particularly, when a panning speed is higher, movement of an image due to the panning speed is much greater than the camera shake. Accordingly, a feeling of discomfort is not particularly recognized even if the camera shake correcting function in the panning direction is turned off. By performing the panning control in this way, it is possible to display an image on a monitor without a feeling of discomfort even during the panning operation.

Control when the panning assist mode is set by the operation unit 131 will be described below. The camera control unit 132 switches the control to panning assist control and transmits information indicating the switching to the lens control unit 113. The lens control unit 113 switches the control mode to the panning assist mode, controls movement of the shift lens group 104 in accordance with a control signal from the camera control unit 132, and performs control of reducing a difference between the moving speed of an object and the panning speed.

The motion vector detection unit 141 in the camera signal processing circuit 124 detects a motion vector of the object from captured image information and outputs the detected motion vector to the camera control unit 132 when the panning assist mode is set. At the same time, the camera control unit 132 receives angular velocity data detected by the angular velocity sensor 111 in the interchangeable lens 100 from the lens control unit 113. The object angular velocity calculation unit 152 calculates an angular velocity of the object on the basis of the motion vector and the angular velocity data of the object and the focal distance. The angular velocity data which is used here needs to correspond to the motion vector acquired from two images. Accordingly, data obtained by averaging a plurality of pieces of angular velocity data acquired between the time points at which two images are acquired is used. In this embodiment, the process of averaging the angular velocity data is performed by the object angular velocity calculation unit 152 of the camera control unit 132. The invention is not limited thereto, but the camera control unit 132 may notifies the lens control unit 113 of an imaging control time and the output unit in the lens control unit 113 (for example, an angular velocity data output unit 602 which will be described later) may perform the process of averaging the angular velocity data.

When a photographer performs panning, the motion vector of an object output from the motion vector detection unit 141 includes a vector corresponding to a main object and a vector corresponding to the background (hereinafter referred to as a background vector). A main object is an object which is imaged by a photographer among a plurality of objects. A process of converting the motion vector into angular velocity data on the basis of the moving distance on an image plane and the focal distance of the imaging optical system is performed. Among the converted angular velocity data, data equivalent to the angular velocity data acquired from the lens control unit 113 can be excluded as the background vector. However, when an offset is included in the angular velocity data acquired from the lens control unit 113, a difference corresponding to the offset from the angular velocity data acquired through conversion of the motion vector may be caused and the background vector may not be excluded. Accordingly, it is preferable that the angular velocity data which is used here be data from which an offset component has been accurately removed. Since the purpose is panning, data having a small moving distance among the motion vectors except for the background vector is a motion vector corresponding to the main object. That is, the value of the motion vector is a moving distance of the main object on the image plane. On the other hand, a difference which is calculated by the object angular velocity calculation unit 152 from the "angular velocity data received by the camera control unit 132" and the "angular velocity data calculated from the moving distance of the main object on the image plane and the focal distance" is angular velocity data associated with the movement of the main object with respect to the imaging apparatus. The camera control unit 132 transmits the calculated angular velocity data of the main object to the lens control unit 113.

The configuration of the panning control unit 118 will be described below in detail with reference to FIG. 2. A camera information acquisition unit 601 acquires a variety of camera information transmitted from the camera control unit 132 from a communication control unit 610. The camera information includes setting information of the panning assist mode, release information, and the like. The camera information acquisition unit 601 outputs the camera information to a setting changing unit 606 and the signal selection unit 405. An angular velocity data output unit 602 performs a process of sampling angular velocity data at a predetermined time, and transmits the angular velocity data to the camera control unit 132. The angular velocity data is sent to the camera control unit 132 via the communication control unit 610. The angular velocity which is used in the panning assist mode needs to be angular velocity data from which an offset is removed. This is because use of angular velocity data from which an offset is not removed causes a decrease in accuracy of the process of excluding the background vector. The process of outputting the angular velocity data in the panning assist mode will be described later with reference to FIG. 6.

An object angular velocity acquisition unit 603 acquires angular velocity data of the main object required for the panning assist control by communication with the camera control unit 132. The angular velocity data of the main object is received by the object angular velocity acquisition unit 603 via the communication control unit 610. The acquired angular velocity data of the main object is an angular velocity from which the panning offset value 415 is removed. An adder 604 performs addition/subtraction (state) using the angular velocity data acquired from the A/D converter 401 as a positive input and using the angular velocity data of the main object and the panning offset value 415 as a negative input. That is, a difference between data obtained by subtracting the panning offset value 415 from the angular velocity data output from the A/D converter 401 and the angular velocity data of the main object acquired by the object angular velocity acquisition unit 603 is calculated. The processes of the object angular velocity acquisition unit 603 and the adder 604 will be described later with reference to FIG. 7.

An integrator 605 performs pseudo-integration on the output of the adder 604 mainly using a low-pass filter. By integrating the corrected angular velocity data, conversion into angle is performed. The sensitivity multiplication unit 607 for optical camera shake correction acquires the angle data from the integrator 605 and multiplies the angle data by sensitivity. This is the same as in the sensitivity multiplication unit 404 and detailed description thereof will not be repeated. During exposure for a still image in the panning assist mode, the signal selection unit 405 of the camera shake correction control unit 117 selects the output of the sensitivity multiplication unit 607 (see (1-A)).

The setting changing unit 606 acquires mode information included in the camera information acquired by the camera information acquisition unit 601 and changes settings depending on the mode. Specifically, information for setting changing is output to the panning control unit 413. The panning control unit 413 changes control details depending on the set or changed mode. An adder 608 performs subtraction using the angular velocity data acquired from the A/D converter 401 as a positive input and using the panning offset value 415 as a negative input. That is, data obtained by subtracting the panning offset value 415 from the angular velocity data output from the A/D converter 401 is calculated and output to the angular velocity data output unit 602. The communication control unit 610 that bidirectionally communicates with the camera control unit 132 transmits the data acquired from the angular velocity data output unit 602 to the camera control unit 132. The communication control unit 610 outputs the angular velocity data of the main object received from the camera control unit 132 to the object angular velocity acquisition unit 603.

Figure 6:
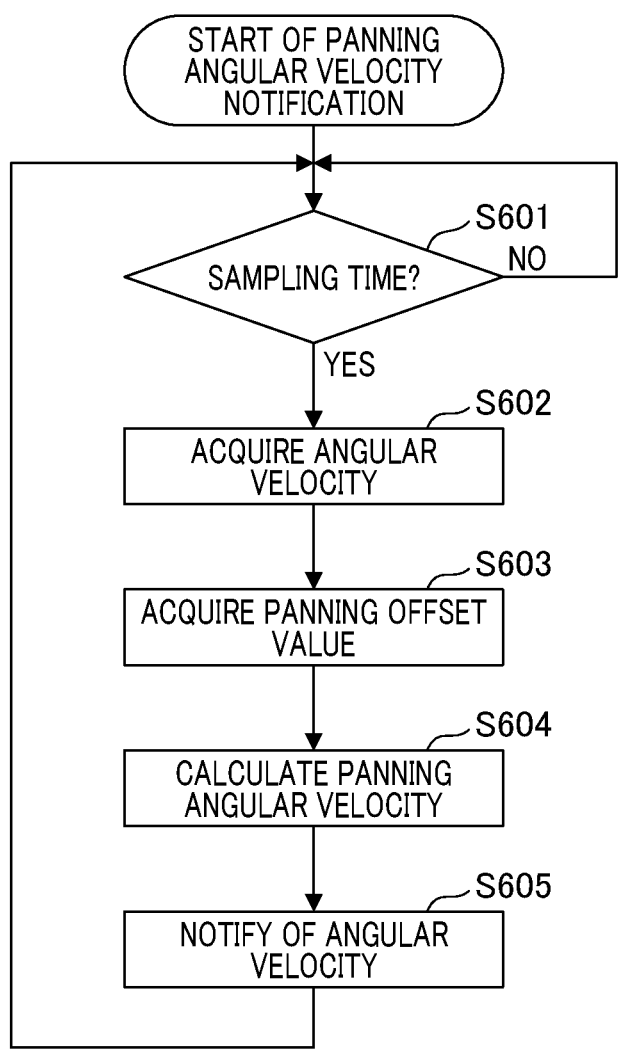
FIG. 6 is a flowchart illustrating calculation of a panning angular velocity.

The process routine which is performed by the angular velocity data output unit 602 and the adder 608 illustrated in FIG. 2 will be described below with reference to the flowchart illustrated in FIG. 6. When the process routine starts, a time determining process based on a sampling period is performed in S601. The sampling period is a period corresponding to about 1 kHz to 10 kHz. The lens control unit 113 causes the process routine to transition to S602 when it is determined that a sampling time for each sampling period has arrived, and repeatedly performs the process of S601 when it is determined that the sampling time has not arrived.

In S602, the adder 608 acquires the angular velocity data from the A/D converter 401. Then, in S603, the adder 608 acquires the panning offset value 415 from the offset calculation unit 406. At this time, the temperature indicated by the temperature detection signal stored in the memory in S301 in FIG. 3 is compared with a current temperature and a change in temperature is calculated. The lens control unit 113 calculates an offset value on the basis of the change in temperature with reference to an offset change table for each temperature which is stored in advance. By using the offset value as the panning offset value 415, it is possible to maintain necessary accuracy to cope with the change in offset temperature.

In S604, the adder 608 subtracts the panning offset value 415 acquired in S603 from the angular velocity data acquired in S602, that is, the angular velocity data from which an offset is not removed. Accordingly, panning angular velocity data is calculated. Then, in S605, the angular velocity data output unit 602 outputs the panning angular velocity data calculated in S604 to the communication control unit 610 and transmits the panning angular velocity data to the camera control unit 132. Then, the process routine returns to S601.

As described above, the angular velocity data output unit 602 can send the angular velocity data from which an offset is removed using the panning offset value 415 to the camera control unit 132.

Figure 7:
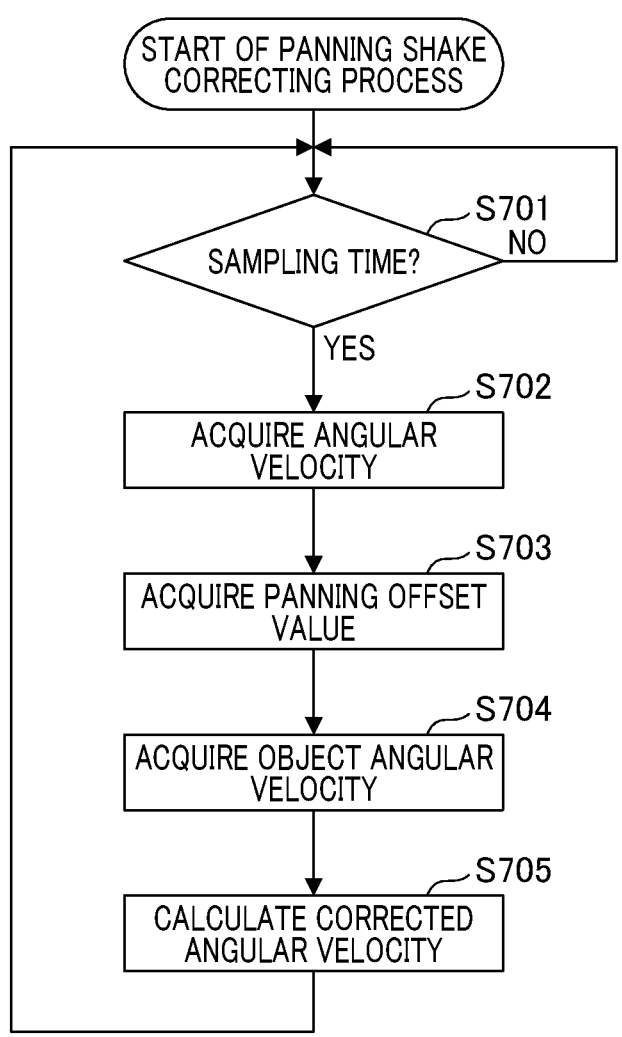
FIG. 7 is a flowchart illustrating panning shake correction.

The process routine which is performed by the object angular velocity acquisition unit 603 and the adder 604 will be described below with reference to the flowchart illustrated in FIG. 7. When the process routine starts, a time determining process based on a sampling period is performed in S701. The lens control unit 113 causes the process routine to transition to S702 when it is determined that a sampling time for each sampling period has arrived, and repeatedly performs the process of S701 when it is determined that the sampling time has not arrived. The sampling period is a period corresponding to about 1 kHz to 10 kHz. The adder 604 acquires the angular velocity data from the A/D converter 401 in S702, and acquires the panning offset value 415 in S703. Similarly to S603 in FIG. 6, the panning offset value 415 is calculated to correspond to the change in temperature.

In S704, the object angular velocity acquisition unit 603 acquires the angular velocity data of the main object from the camera control unit 132 and outputs the acquired angular velocity data to the adder 604. In S705, the adder 604 subtracts the panning offset value 415 and the angular velocity data of the main object from the angular velocity data output from the A/D converter 401, that is, the angular velocity data from which an offset is not removed. Accordingly, corrected angular velocity data is calculated and output to the integrator 605. Then, the process routine returns to S701.

In this embodiment, when the panning assist mode is set by the operation unit 131, the camera information acquisition unit 601 acquires the mode information via the communication control unit 610 and notifies the setting changing unit 606 of the acquired mode information. The setting changing unit 606 changes settings of the panning control unit 413 depending on the notified mode information. The setting changing process which is performed here is a changing process for facilitating transitioning to a fast panning state. Specifically, the predetermined values $\beta$ and $\alpha$ for panning determination are changed. The angular velocity data output unit 602 outputs the angular velocity data calculated by the adder 608 to the communication control unit 610 to transmit the angular velocity data to the camera control unit 132. The object angular velocity acquisition unit 603 acquires angular velocity data associated with movement of the main object which is transmitted from the camera control unit 132 to the lens control unit 113. The adder 604 subtracts the panning offset value 415 from the angular velocity data detected by the angular velocity sensor 111, calculates a difference from the angular velocity data of the main object, and outputs the calculated difference to the integrator 605. The integrator 605 acquires a signal indicating during an exposure period which is acquired by the camera information acquisition unit 601 and performs an integrating operation in the period. The output of the integrator 605 is converted into a degree of driving of the shift lens by the sensitivity multiplication unit 607. The output of the sensitivity multiplication unit 607 is sent to the adder 410 via the signal selection unit 405. The adder 410 subtracts shift lens position information from the output of the sensitivity multiplication unit 607 and calculates a degree of driving of the shift lens.

When the panning assist mode is set, the camera shake correcting operation is prohibited in the interchangeable lens 100. That is, the shift lens group 104 corrects a value corresponding to a difference between the angular velocity in the panning operation of the camera and the angular velocity of the main object. Accordingly, a process for increasing a success probability of panning is performed. An example of the reason for failure of panning is that a difference between the panning speed of the camera in an exposure period and the moving speed of the object is remarkable. In this embodiment, the difference can be reduced by movement of the shift lens and thus panning can succeed.

In this embodiment, the process of subtracting the offset value 414 from the output of the angular velocity sensor 111 is performed to improve accuracy of the camera shake correction, but satisfactory shake correction cannot be performed when the offset value changes in the panning assist mode. Therefore, when the offset value 414 changes during the offset removing operation, a process of converting the angular velocity data by performing correction based on the panning offset value 415 is performed on the angular velocity data. According to this embodiment, even when the offset value is changed for offset correction of the angular velocity sensor, it is possible to correctly perform correction for panning.

Second embodiment

A second embodiment of the invention will be described below. In the first embodiment, the panning assisting process using the angular velocity data based on the offset value 414 (preliminary value) in the initial process (S301 in FIG. 3) is performed until determination of the offset value is completed. On the other hand, in this embodiment, a process of frequently updating the panning offset value 415 is performed in consideration of a case in which the offset value 414 decreases slowly in a time series. Accordingly, it is possible to improve accuracy of the panning assist even when the offset removing operation is being performed. Description of the same elements and processes in this embodiment as in the first embodiment will be omitted and differences therebetween will be mainly described below. This method of omitting description is applied to an embodiment will be described later.

Figure 8:
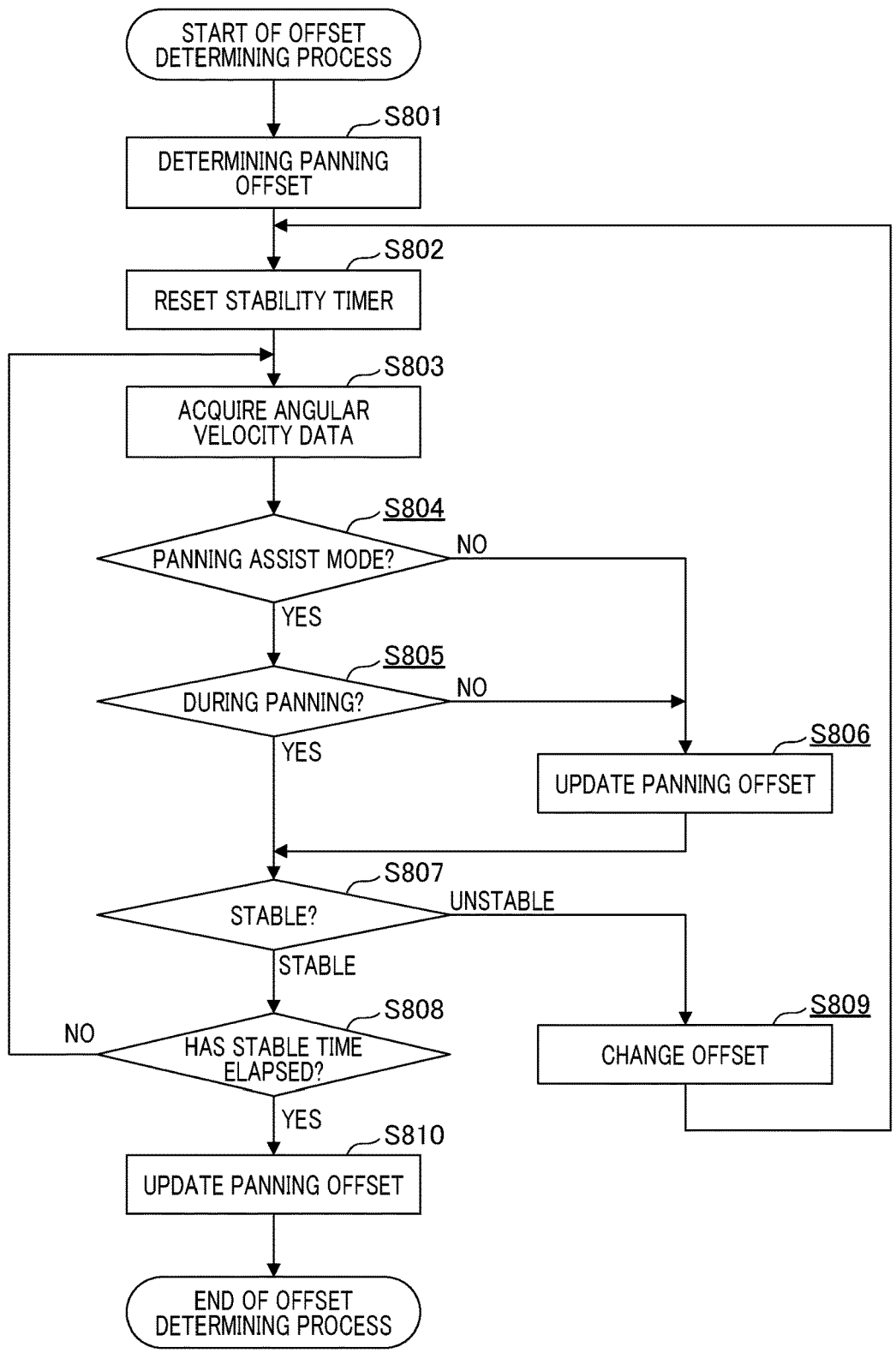
FIG. 8 is a flowchart illustrating an offset determining process according to a second embodiment of the invention.

The offset determining process according to this embodiment will be described below with reference to FIG. 8. FIG. 8 is a flowchart illustrating the offset determining process of the angular velocity sensor 111 which is performed by the offset calculation unit 406. The processes from S801 to S803, S807, S808, and S810 are the same as the processes from S301 to S303, S304, S305, and S306 in FIG. 3 and thus the processes from S804 to S806 and S809 will be described.

When the angular velocity data is acquired from the angular velocity sensor 111 in S803, the process routine transitions to S804. In S804, the lens control unit 113 determines whether a current mode is the panning assist mode. The process routine transitions to S805 when it is determined that the current mode is the panning assist mode, and the process routine transitions to S806 when it is determined that the current mode is not the panning assist mode.

In S805, the panning control unit 413 performs determination of panning. The process routine transitions to S807 when it is determined that the panning operation is being performed, and the process routine transitions S806 when it is determined that the panning operation is not being performed. In S806, the offset calculation unit 406 changes the panning offset value 415 using the current offset value 414 and then causes the process routine to transition to S807. Here, when the previous panning offset value 415 is updated, it is assumed that offset reliability which will be described later is stored in the memory. The offset calculation unit 406 compares current reliability with the stored offset reliability and updates the reliability only when the current reliability is higher. The temperature detection signal stored in S801 is also updated.

When it is determined in S807 that the difference between the angular velocity data acquired in S803 and the offset value 414 is greater than a threshold value, the process routine transitions to S809. In S809, the offset calculation unit 406 changes the offset value 414 using the angular velocity data acquired in S803 and then returns the process routine to S802. Here, by performing comparison with vectors of portions near corners of an image (vectors having a high probability of a background), the offset reliability is calculated. It is assumed that the reliability becomes higher as the acquired angular velocity gets closer to a value obtained by converting the background vector into the angular velocity. The calculated reliability is stored in the memory every update. After S809 is performed, the process routine returns to S802 and continues to be performed.

According to this embodiment, when the offset value 414 having higher accuracy than the panning offset value 415 is set, it is possible to enhance accuracy of panning assist by updating the panning offset value 415 using the offset value 414.

Third embodiment

A third embodiment of the invention will be described below. In the first and second embodiments, the offset information (414 and 415) is used in the lens control unit 113. In this embodiment, the angular velocity data and the offset value 414 as a set are transmitted to the camera control unit 132 by the lens control unit 113. Accordingly, when the offset value changes during the offset removing operation in the interchangeable lens 100, it is possible to cope with the change of the offset value using the process of the camera control unit 132.

Figure 9:
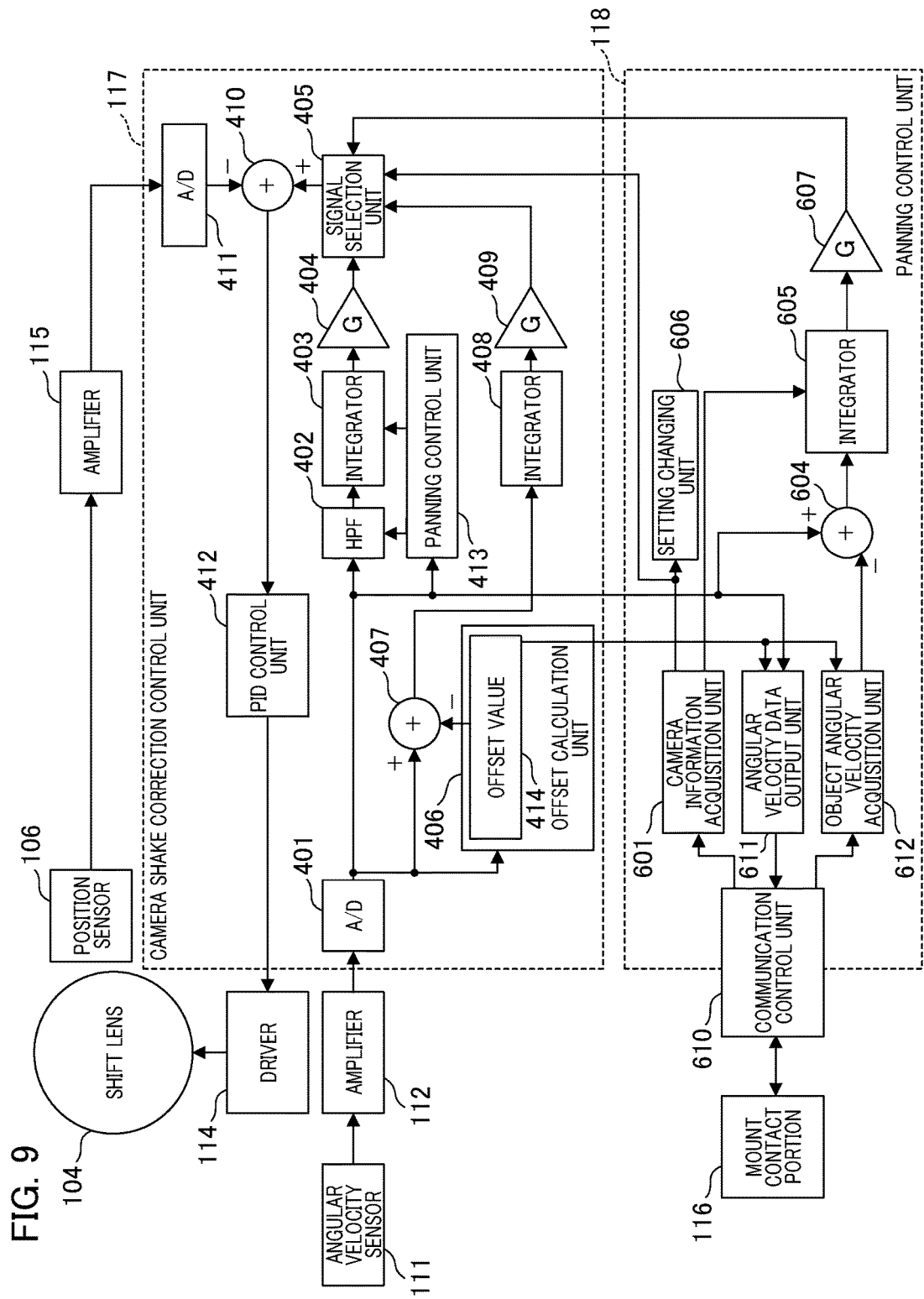
FIG. 9 is a diagram illustrating a configuration of panning assist control according to a third embodiment of the invention.

FIG. 9 is a diagram illustrating a configuration associated with the camera shake correction control and the panning assist operation according to this embodiment. Points changed from the configuration illustrated in FIG. 2 will be described below.

The panning offset value 415 and the adder 608 are not provided.

The offset calculation unit 406 calculates and stores only the offset value 414 and does not calculate the panning offset value 415. The offset value 414 is output to the adder 407, an angular velocity data output unit 611, and an object angular velocity acquisition unit 612.

The panning offset value 415 is not input to the adder 604. That is, the adder 604 subtracts the output of the object angular velocity acquisition unit 612 from the output of the A/D converter 401 and outputs the subtraction result to the integrator 605.

The angular velocity data output unit 602 illustrated in FIG. 2 is replaced with the angular velocity data output unit 611.

The angular velocity data output unit 611 outputs a set of the angular velocity data acquired from the A/D converter 401 and the offset value 414 corresponding thereto to the communication control unit 610 to transmit the set to the camera control unit 132.

The object angular velocity calculation unit 152 according to this embodiment selects one corresponding offset value from the angular velocity data to be averaged when averaging the angular velocity data. A process of excluding a background vector is performed using the angular velocity data from which an offset has been removed on the basis of the offset value, and a motion vector of a main object is determined. The object angular velocity calculation unit 152 calculates the angular velocity data of the main object on the basis of the motion vector of the main object and the average value of the angular velocity data not subjected to the offset control. The calculated angular velocity data of the main object is transmitted from the camera control unit 132 to the lens control unit 113.

The object angular velocity acquisition unit 603 illustrated in FIG. 2 is replaced with the object angular velocity acquisition unit 612.

The object angular velocity acquisition unit 612 acquires the offset value 414, acquires the angular velocity data of the main object received from the camera control unit 132 via the communication control unit 610, and outputs the acquired data to the adder 604. The angular velocity data of the main object is data which is calculated on the basis of the determined motion vector of the main object and the angular velocity data not subjected to the offset control. Since the adder 604 subtracts the angular velocity data of the main object from the angular velocity data including an offset component, the offset component is cancelled.

In this embodiment, the angular velocity data of an object which is transmitted from the lens control unit 113 to the camera control unit 132 is data from which an offset has not been removed. The invention is not limited thereto, but the angular velocity data from which an offset has been removed may be transmitted. In this case, the camera control unit 132 needs to perform a process of calculating an angular velocity of the object after changing the angular velocity data to angular velocity data not subjected to the offset control.

According to this embodiment, in communication between the lens apparatus (the lens control unit 113) and the body portion of the imaging apparatus (the camera control unit 132), panning correction equivalent to that in the first embodiment can be realized by adding offset information (414) to communication information.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-015025 filed on Jan. 31, 2017, which are hereby incorporated by reference herein in its entirety.

What is claimed is:

1. An image shake correction apparatus that corrects a shake of an object image using an image shake correction unit, the object image being imaged by an imaging unit through an imaging optical system, the image shake correction apparatus comprising:
a memory; and
a processor operating in accordance with a program stored in the memory,
the processor comprising:
an offset calculator configured to acquire a detection signal of shake from a first detector and to calculate first and second offset values;
a first controller configured to control the image shake correction unit using a first signal obtained by subtracting the first offset value from the detection signal;
an angular velocity calculator configured to calculate angular velocity data of the object image with respect to the image shake correction apparatus from a second signal obtained by subtracting the second offset value from the detection signal, a moving distance of the object image detected by a second detector, and a focal distance of the imaging optical system; and
a second controller configured to calculate a difference between the angular velocity data of the object image and data indicated by the second signal and to control the image shake correction unit.

2. The image shake correction apparatus according to claim 1, further comprising:
a temperature sensor configured to detect a temperature,
wherein the offset calculator acquires a temperature detection signal from the temperature sensor and changes the first and second offset values.

3. The image shake correction apparatus according to claim 1, wherein the offset calculator updates the second offset value using the first offset value.

4. The image shake correction apparatus according to claim 3, wherein the offset calculator changes the second offset value using the first offset value, when the second controller controls the image shake correction unit.

5. The image shake correction apparatus according to claim 3,
wherein the processor further comprises a determination unit configured to determine whether a panning or tilting operation has been performed using the detection signal, and
the offset calculator changes the second offset value using the current first offset value, when the second controller controls the image shake correction unit and the determination unit determines that the panning or tilting operation has been performed.

6. The image shake correction apparatus according to claim 1,
wherein the processor further comprises a setting unit configured to set a mode in which panning is supported, and
the second controller controls the image shake correction unit when the mode is set, and the first controller controls the image shake correction unit when the mode is not set.

7. The image shake correction apparatus according to claim 1, wherein the image shake correction unit includes a correction lens configured to correct the shake by changing an image forming position of light from the object image.

8. An image shake correction apparatus that corrects a shake of an object image using an image shake correction unit, the object image being imaged by an imaging unit through an imaging optical system, the image shake correction apparatus comprising:
a memory; and
a processor operating in accordance with a program stored in the memory,
the processor comprising:
an offset calculator configured to acquire a detection signal of shake from a first detector and to calculate an offset value;
a first controller configured to control the image shake correction unit using a signal obtained by subtracting the offset value from the detection signal;
an angular velocity calculator configured to calculate angular velocity data of the object image with respect to the image shake correction apparatus from the detection signal, the offset value, a moving distance of the object image detected by a second detector, and a focal distance of the imaging optical system; and
a second controller configured to calculate a difference between the angular velocity data of the object image and data indicated by the detection signal and to control the image shake correction unit.

9. The image shake correction apparatus according to claim 8,
wherein the processor further comprises a setting unit configured to set a mode in which panning is supported, and
the second controller controls the image shake correction unit when the mode is set, and the first controller controls the image shake correction unit when the mode is not set.

10. The image shake correction apparatus according to claim 8, wherein the image shake correction unit includes a correction lens configured to correct the shake by changing an image forming position of light from the object image.

11. A lens apparatus that is attachable to a body portion of an imaging apparatus, the lens apparatus comprising an image shake correction unit that corrects a shake of an object image, the object image being imaged by an imaging unit through an imaging optical system,
the lens apparatus comprising:
a memory; and
a processor operating in accordance with a program stored in the memory,
the processor comprising:
an offset calculator configured to acquire a detection signal of shake from a first detector and to calculate first and second offset values;
a first controller configured to control the image shake correction unit using a first signal obtained by subtracting the first offset value from the detection signal;
an output unit configured to output a second signal obtained by subtracting the second offset value from the detection signal to the body portion of the imaging apparatus;
an acquisition unit configured to acquire angular velocity data of the object image with respect to the imaging apparatus from the body portion of the imaging apparatus; and
a second controller configured to calculate a difference between the angular velocity data of the object image and data indicated by the second signal and to control the image shake correction unit.

12. A lens apparatus that is attachable to a body portion of an imaging apparatus, the lens apparatus comprising an image shake correction unit that corrects a shake of an object image, the object image being imaged by an imaging unit through an imaging optical system,
the lens apparatus comprising:
a memory; and
a processor operating in accordance with a program stored in the memory,
the processor comprising:
an offset calculator configured to acquire a detection signal of shake from a first detector and to calculate an offset value;
a first controller configured to control the image shake correction unit using a signal obtained by subtracting the offset value from the detection signal;
an output unit configured to output the detection signal and the offset value to the body portion of the imaging apparatus;
an acquisition unit configured to acquire angular velocity data of the object image with respect to the imaging apparatus from the body portion of the imaging apparatus; and
a second controller configured to calculate a difference between the angular velocity data of the object image and data indicated by the detection signal and to control the image shake correction unit.

13. An imaging apparatus to which a lens apparatus is attachable,
the lens apparatus comprising:
a memory; and
a processor operating in accordance with a program stored in the memory,
the processor comprising:
an image shake correction unit that corrects a shake of an object image, the object image being imaged by an imaging unit through an imaging optical system;
an offset calculator configured to acquire a detection signal of shake from a first detector and to calculate first and second offset values;
a first controller configured to control the image shake correction unit using a first signal obtained by subtracting the first offset value from the detection signal;
an output unit configured to output a second signal obtained by subtracting the second offset value from the detection signal to the body portion of the imaging apparatus;
an acquisition unit configured to acquire angular velocity data of the object image with respect to the imaging apparatus from the body portion of the imaging apparatus; and
a second controller configured to calculate a difference between the angular velocity data of the object image and data indicated by the second signal and to control the image shake correction unit, the imaging apparatus comprising:
a second detector configured to detect a moving distance of the object image; and
an angular velocity calculator configured to calculate the angular velocity data of the object image with respect to the imaging apparatus from the second signal, the moving distance of the object image, and a focal distance of the imaging optical system.

14. An imaging apparatus to which a lens apparatus is attachable,
the lens apparatus comprising:
a memory; and
a processor operating in accordance with a program stored in the memory,
the processor comprising:
an image shake correction unit that corrects a shake of an object image, the object image being imaged by an imaging unit through an imaging optical system;
an offset calculator configured to acquire a detection signal of shake from a first detector and to calculate an offset value;
a first controller configured to control the image shake correction unit using a signal obtained by subtracting the offset value from the detection signal;
an output unit configured to output the detection signal and the offset value to the body portion of the imaging apparatus;
an acquisition unit configured to acquire angular velocity data of the object image with respect to the imaging apparatus from the body portion of the imaging apparatus; and
a second controller configured to calculate a difference between the angular velocity data of the object image and data indicated by the detection signal and to control the image shake correction unit,
the imaging apparatus comprising:
a second detector configured to detect a moving distance of the object image; and
an angular velocity calculator configured to calculate the angular velocity data of the object image with respect to the imaging apparatus from the detection signal, the offset value, the moving distance of the object image, and a focal distance of the imaging optical system.

15. A control method that is performed using an image shake correction apparatus, the image shake correction apparatus correcting a shake of an object image using an image shake correction unit, the object image being imaged by an imaging unit through an imaging optical system, the control method comprising:
calculating first and second offset values after an offset calculator acquires a detection signal of shake from a first detector;
controlling the image shake correction unit by a first controller, using a first signal obtained by subtracting the first offset value from the detection signal;
calculating angular velocity data of the object image with respect to the image shake correction apparatus from a second signal obtained by subtracting the second offset value from the detection signal, a moving distance of the object image detected by a second detector, and a focal distance of the imaging optical system; and
controlling the image shake correction unit by a second controller, calculating a difference between the angular velocity data of the object image and data indicated by the second signal.

16. A control method that is performed using an image shake correction apparatus, the image shake correction apparatus correcting a shake of an object image using an image shake correction unit, the object image being imaged by an imaging unit through an imaging optical system, the control method comprising:
calculating offset value after an offset calculator acquires a detection signal of shake from a first detector;
controlling the image shake correction unit by a first controller, using a signal obtained by subtracting the offset value from the detection signal;
calculating angular velocity data of the object image with respect to the image shake correction apparatus from the detection signal, the offset value, a moving distance of the object image detected by a second detector, and a focal distance of the imaging optical system; and
controlling the image shake correction unit by a second controller, calculating a difference between the angular velocity data of the object image and data indicated by the detection signal.

* * * * *